United States Patent
Zhang et al.

(10) Patent No.: US 11,938,832 B2
(45) Date of Patent: Mar. 26, 2024

(54) CHARGING STATION WITH MULTIPLE CHARGING PLUG AND CIRCUIT FOR CHARGING STATION

(71) Applicant: Sungrow Power Supply Co., Ltd., Hefei (CN)

(72) Inventors: Huali Zhang, Anhui (CN); Xiangfa Liu, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 277 days.

(21) Appl. No.: 17/408,551

(22) Filed: Aug. 23, 2021

(65) Prior Publication Data
US 2022/0118864 A1 Apr. 21, 2022

(30) Foreign Application Priority Data
Oct. 15, 2020 (CN) .......................... 202011102702.2

(51) Int. Cl.
*B60L 53/16* (2019.01)
*B60L 53/10* (2019.01)
(Continued)

(52) U.S. Cl.
CPC ............. *B60L 53/16* (2019.02); *B60L 53/11* (2019.02); *B60L 53/30* (2019.02); *H02J 7/0024* (2013.01);
(Continued)

(58) Field of Classification Search
CPC .......... B60L 53/16; B60L 53/11; B60L 53/30; B60L 2210/10; B60L 2210/30;
(Continued)

(56) References Cited

U.S. PATENT DOCUMENTS

2013/0020989 A1* 1/2013 Xia ..................... H02M 7/2176
320/109
2013/0257146 A1* 10/2013 Nojima ................... B60L 53/22
307/9.1
(Continued)

FOREIGN PATENT DOCUMENTS

CN 105119334 A 12/2015
CN 106364348 A 2/2017
(Continued)

OTHER PUBLICATIONS

First Office Action for Chinese Application No. 202011102702.2, dated Sep. 2, 2021.
(Continued)

*Primary Examiner* — Paul Dinh
(74) *Attorney, Agent, or Firm* — Wolf, Greenfield & Sacks, P.C.

(57) ABSTRACT

A charging station with multiple plugs and a circuit for the charging station are provided. The circuit comprises a power distribution unit, a control unit, one AC/DC unit and multiple DC/DC units. The AC/DC unit is connected with an input end of each DC/DC unit via a bus; an output end of each DC/DC unit is connected to a corresponding charging plug port via the power distribution unit; and the control unit is configured to detect an output voltage of each of the DC/DC units, and control the power distribution unit to operate according to the output voltage of each of the DC/DC units and a power requirement of a charging plug port, to cause at least one of the DC/DC units to be connected to the charging plug port to achieve power distribution of the charging plug port.

11 Claims, 7 Drawing Sheets

(51) Int. Cl.
*B60L 53/30* (2019.01)
*H02J 7/00* (2006.01)
*H02J 7/02* (2016.01)

(52) U.S. Cl.
CPC .............. *H02J 7/02* (2013.01); *B60L 2210/10* (2013.01); *B60L 2210/30* (2013.01)

(58) Field of Classification Search
CPC ........ B60L 53/302; B60L 53/62; B60L 53/14; B60L 53/60; B60L 53/31; H02J 7/0024; H02J 7/02; H02J 2207/20; H02J 2310/48; H02J 7/00047; H02J 7/0013; H02M 1/4208; H02M 1/007; H02M 1/0077; H02M 1/008; H02M 3/155; H02M 7/06; Y02T 90/14; Y02T 10/70; Y02T 10/7072; Y02T 10/92; Y02T 90/12
USPC ......................................................... 320/109
See application file for complete search history.

(56) References Cited

U.S. PATENT DOCUMENTS

| | | |
|---|---|---|
| 2017/0240063 A1 | 8/2017 | Herke et al. |
| 2018/0205235 A1 | 7/2018 | Yuan |
| 2019/0217734 A1 | 7/2019 | Li et al. |
| 2019/0344682 A1 | 11/2019 | Ge et al. |

FOREIGN PATENT DOCUMENTS

| | | |
|---|---|---|
| CN | 205970891 U | 2/2017 |
| CN | 106505704 A | 3/2017 |
| CN | 106696748 A | 5/2017 |
| CN | 107453462 A | 12/2017 |
| CN | 107650730 A | 2/2018 |
| CN | 207772923 U | 8/2018 |
| CN | 110979075 A | 4/2020 |
| CN | 110994755 A | 4/2020 |
| KR | 2017-0124851 A | 11/2017 |

OTHER PUBLICATIONS

Extended European Search Report for European Application No. 21189506.5, dated Jan. 24, 2022.

\* cited by examiner

CHARGING STATION WITH MULTIPLE CHARGING PLUG AND CIRCUIT FOR CHARGING STATION

CROSS REFERENCE OF RELATED APPLICATION

The present application claims priority to Chinese Patent Application No. 202011102702.2, titled "CHARGING STATION WITH MULTIPLE CHARGING PLUG AND CIRCUIT FOR CHARGING STATION", filed on Oct. 15, 2020 with the China National Intellectual Property Administration, which is incorporated herein by reference in its entirety.

FIELD

The present disclosure relates to the technical field of charging stations, and in particular to a charging station with multiple charging plugs and a circuit for a charging station.

BACKGROUND

With the awareness of environment protection, in order to reduce greenhouse effect and improve environment pollution, research and development of new energy vehicles are increasingly popular in the global. Further, requirements on power density and protection level of charging stations for electric vehicles are constantly upgraded.

Currently, for the topology of the charging station for the electric vehicles, a module is generally separated from a pile. As shown in FIG. 1, redundancy output of N+1 module parallel is adopted, that is, each direct current module operates independently, and the power distribution and current sharing output are performed according to a Can bus communication and an output power of the direct current module, so that a single plug output or a double plug output is implemented by the direct current charging station according to the number and the power of the modules connected in parallel.

The solution of multiple modules connected in parallel in the conventional technology has disadvantages of a large space occupation, a high cost, high standby power consumption and so on. Moreover, redundancy output of module parallel is adopted, in which a single charging plug or double charging plugs are provided, one module corresponds to a charging plug, and thus cannot be used by multiple users simultaneously.

SUMMARY

In view of above, a charging station with multiple charging plugs and a circuit for the charging station are provided according to the present disclosure, to solve the problem of high cost, high standby power consumption and unable to meet simultaneous use of multiple users in the conventional technology.

The following technical solutions are provided according to embodiments of the present disclosure.

A circuit for a charging station with multiple charging plugs is provided according to a first aspect of the present disclosure. The circuit includes a power distribution unit, a control unit, one alternating current (AC)/direct current (DC) unit and at least two DC/DC units. The AC/DC unit is connected with an input end of each of the DC/DC units via a bus. An output end of each of the DC/DC units is connected to a corresponding charging plug port via the power distribution unit. The control unit is configured to detect an output voltage of each of the DC/DC units, and control the power distribution unit to operate according to the output voltage of each of the DC/DC units and a power requirement of a charging plug port, to cause at least one of the DC/DC units to be connected to the charging plug port to achieve power distribution of the charging plug port.

In an embodiment, the power distribution unit includes at least one of a parallel branch that connects the output ends of the DC/DC units in parallel and a series branch that connects the output ends of the DC/DC units in series, wherein the parallel branch and the series branch each is provided with a controllable switch.

In an embodiment, the parallel branch includes a positive branch that connects positive output ends of the DC/DC units together and a negative branch that connects negative output ends of the DC/DC units together, wherein the positive branch and the negative branch each is provided with a controllable switch.

In an embodiment, the series branch includes a branch that connects a positive output end of one DC/DC unit to a negative output end of another DC/DC unit.

In an embodiment, the power distribution unit further includes independent branches configured to cause the DC/DC units output independently from each other, wherein the independent branches each is provided with a controllable switch.

In an embodiment, each of the DC/DC units is connected to a corresponding charging plug port via one of the independent branches.

In an embodiment, the independent branch includes a positive branch and a negative branch arranged at the output end of the DC/DC unit corresponding to the independent branch, wherein at least the positive branch is provided with a controllable switch.

In an embodiment, the control unit, for controlling the power distribution unit to operate, is configured to: control the controllable switch in the power distribution unit to be closed or opened, to cause the DC/DC units to output independently or cause the DC/DC units to be connected in series and/or in parallel for output.

In an embodiment, the control unit includes controllers respectively arranged in the DC/DC units. The controller is configured to detect an output voltage of the corresponding DC/DC unit, and control the controllable switch in the power distribution unit to be closed or opened, to control power distribution of the DC/DC unit.

In an embodiment, a main circuit of the DC/DC unit is an isolated conversion topology or a non-isolated conversion topology.

In an embodiment, a main circuit of the AC/DC unit is a single-phase rectifier power factor correction rectifier circuit or a three-phase rectifier power factor correction rectifier circuit.

A charging station with multiple charging plugs is further provided according to a second aspect of the present disclosure. The charging station includes a shell, a heat sink arranged inside the shell, the circuit for the charging station described above, and multiple charging plugs arranged outside the shell. Input ends of the plurality of charging plugs are connected to the charging plug ports in the circuit respectively. The heat sink is configured to dissipate heart from the circuit for the charging station.

Based on the circuit for the charging station with multiple plugs according to the embodiments of the present disclosure described above, only one AC/DC unit is used for rectification, and multiple DC/DC units are connected to a DC side of the AC/DC unit simultaneously, so that the numbers of the controllers and the control circuits of the rectifier units are less, that is, the number of passive components is less, therefore the rectifier cost is low, the standby power consumption is small, and the reactive power loss is low. In addition, an output end of each of the DC/DC units is connected to a corresponding charging plug port via the power distribution unit, and then the control unit controls the power distribution unit to operate according to an output voltage of each of the DC/DC units and a power requirement of a charging plug port corresponding to the each of the DC/DC units, to cause at least one of the DC/DC units to be connected to a charging plug port corresponding to the DC/DC unit to achieve power distribution of the charging plug port. In other words, the circuit for the charging station is provided with multiple charging plug ports, and the power of each of the charging plug ports is distributed by the control unit and the power distribution unit, to simultaneously meet requirements of multiple users, thereby improving the utilization rate of the charging station.

BRIEF DESCRIPTION OF THE DRAWINGS

In order to illustrate technical solutions in embodiments of the present disclosure or in the conventional technology in details, drawings to be used in the description of the embodiments or the conventional technology are briefly described hereinafter. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are described in details in conjunction with the drawings in the embodiments according to the present disclosure hereinafter. Apparently, the described embodiments are only some embodiments of the present disclosure, rather than all embodiments. Any other embodiments obtained by those skilled in the art based on the embodiments of the present disclosure without any creative work fall within the protection scope of the present disclosure.

In the present disclosure, the terms "comprise", "include", or any other variants thereof are intended to be non-exclusive, such that the process, method, article, or device including a series of elements includes not only those elements but also those elements that are not enumerated, or also includes the elements that are inherent to such process, method, article, or device. Unless expressively limited, the statement "comprising (including) one . . . " does not exclude the case that other similar elements may exist in the process, the method, the article or the device other than enumerated elements.

Figure 1:
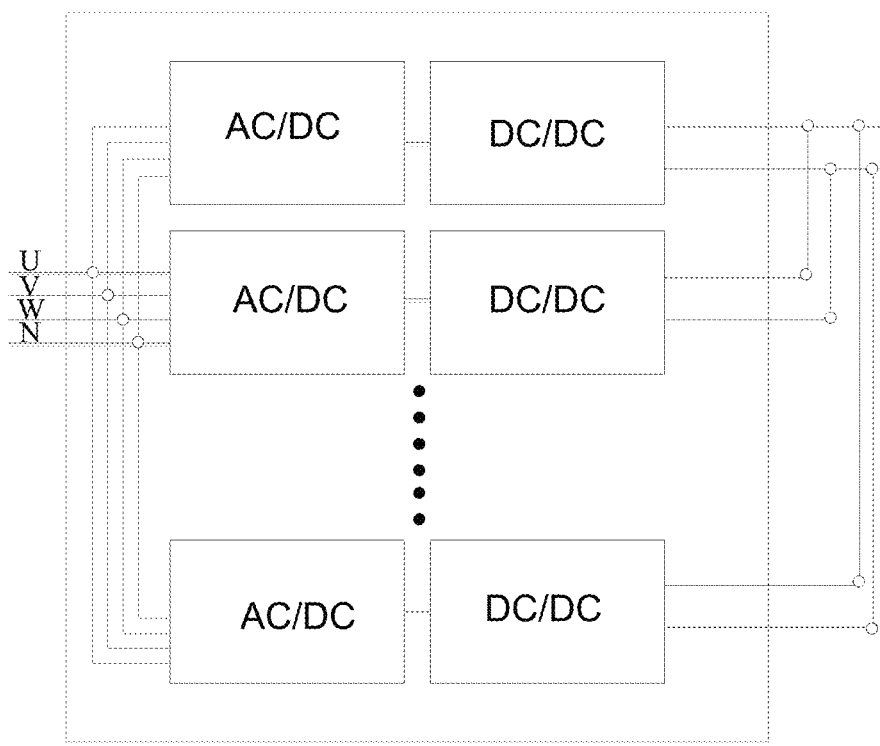
FIG. 1 is a schematic structural diagram of an application topology of a direct current charging station of electric vehicles according to the conventional technology.
Figure 2:
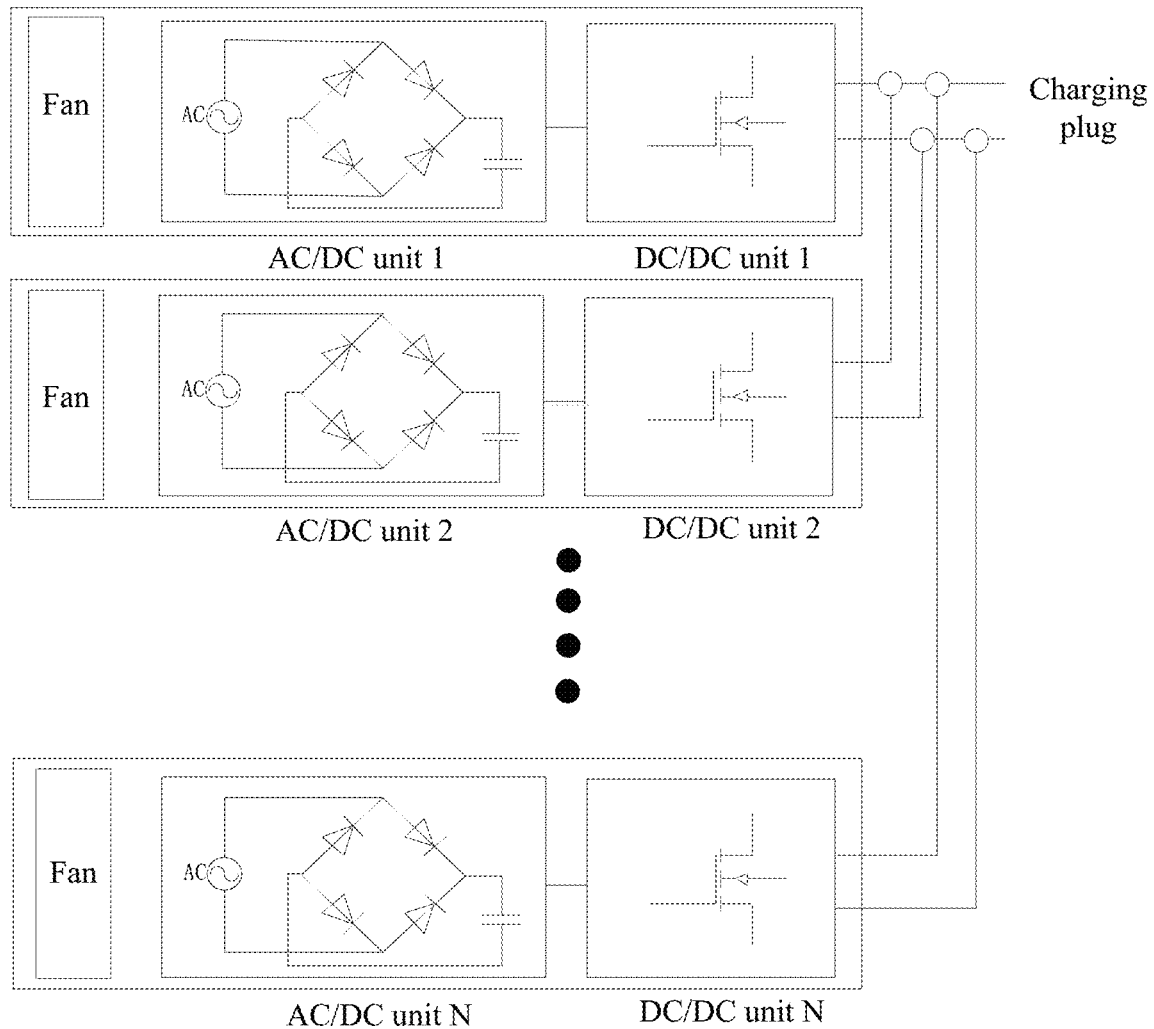
FIG. 2 is a schematic structural diagram of internal arrangement in the direct current charging station of electric vehicles according to the conventional technology.

As shown in FIG. 1, currently for the topology of the charging station for the electric vehicles, a module is generally separated from a pile, and redundancy output of N+1 module parallel is adopted. The module structure is shown in FIG. 2. Each module includes an alternating current (AC)/direct current (DC) rectifier circuit (such as an AC/DC unit 1 to an AC/DC unit N shown in FIG. 2) and a DC/DC direct current converter circuit (such as a DC/DC unit 1 to a DC/DC unit N shown in FIG. 2). In practices, in a case that a charging station is in a standby mode, each module generates standby power consumption, and thus a reactive power factor in the standby mode is high. Moreover, each module is independently provided with a filter, a controller and a control sampling circuit (not shown in FIG. 2), and thus the number of devices is large and hardware cost is high in a multi-module mode. In addition, the conventional charging station adopts redundancy output of module parallel, and the charging station is provided with a single charging plug (as shown in FIG. 2) or two charging plugs (not shown). The module corresponds to a charging plug, and thus cannot be used by multiple users simultaneously.

Therefore, a circuit for a charging station with multiple plugs is provided according to an embodiment of the present disclosure, to solve problems of a high cost, high standby power consumption and unable to meet simultaneous use of multiple users in the conventional technology.

Figure 3:
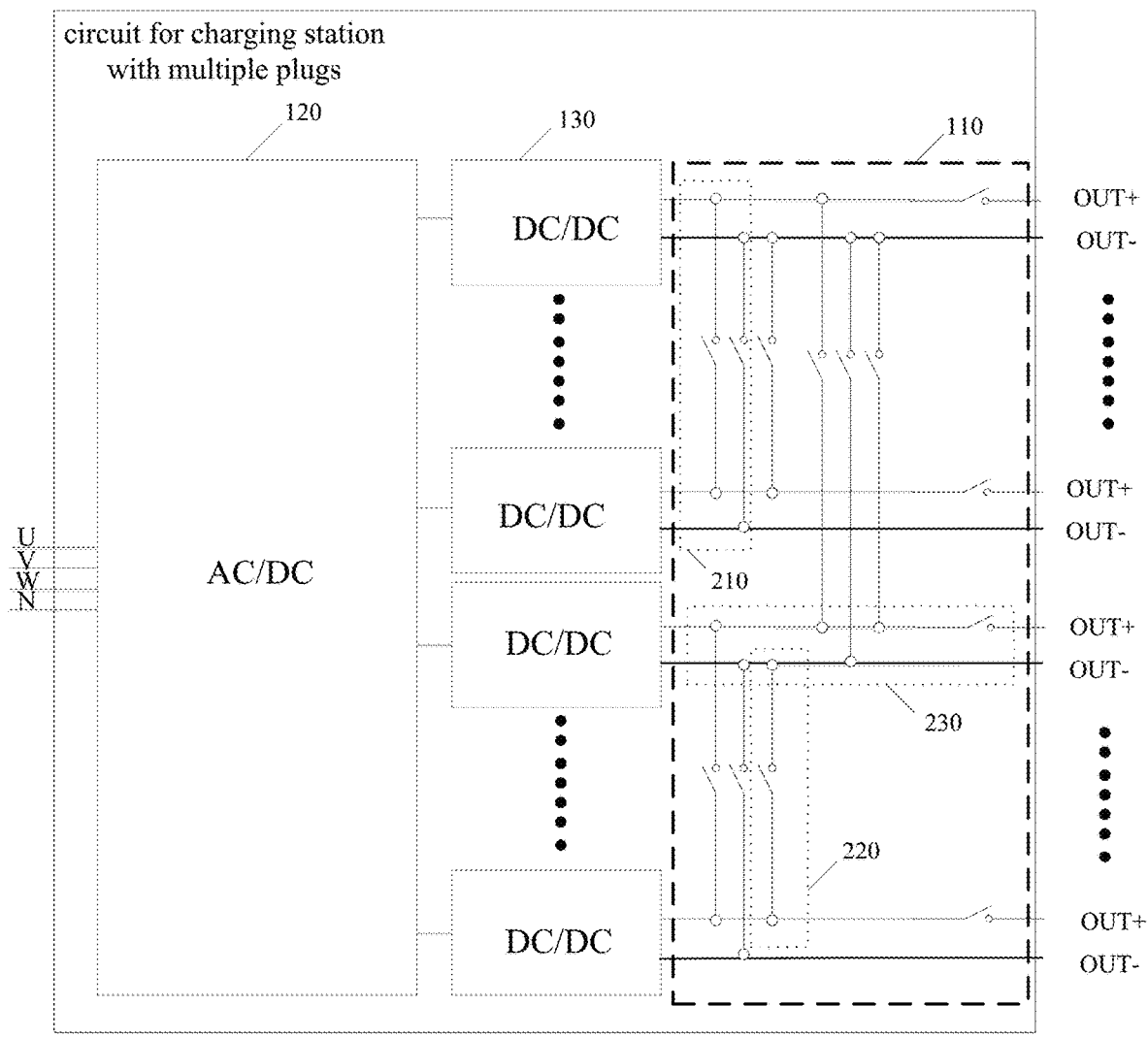
FIG. 3 is a schematic structural diagram of a circuit for a charging station with multiple plugs according to an embodiment of the present disclosure.

A schematic structural diagram of a circuit for a charging station with multiple plugs is shown in FIG. 3. The circuit includes a power distribution unit 110, a control unit (not shown in FIG. 3), one AC/DC unit 120 and at least two DC/DC units 130.

The AC/DC unit 120 is connected with an input end of each of the DC/DC units 130 via a bus. In practices, in a case that multiple DC/DC units 130 are arranged as shown in FIG. 3, the multiple DC/DC units 130 share one AC/DC unit 120 via the bus according to the embodiment of the present disclosure, rather than adopting multi-module parallel connection as in the conventional technology. Moreover, the AC/DC unit 120 may be a power factor correction rectifier circuit, that is, a bus voltage of the AC/DC unit 120 is within a certain voltage range, and the bus voltage may be adjusted according to an output voltage of each of the DC/DC units 130. That is, different DC/DC units 130 share one AC/DC unit 120, so that the number of passive devices in the rectifier unit is less, the standby power consumption is less, and reactive power loss is small. In addition, only one rectifier unit is arranged, so that the number of the controller and the control circuit of the rectifier unit is reduced, thereby reducing rectification cost.

An output end of each of the DC/DC units 130 is connected to a corresponding charging plug port (that is, OUT+, OUT− shown in FIG. 3) via the power distribution unit 110. The control unit is configured to detect the output voltage of each of the DC/DC units 130, and control the power distribution unit 110 to operate according to the output voltage of each of the DC/DC units 130 and a power requirement of a charging plug port, so that at least one DC/DC unit 130 is connected to the charging plug port to achieve power distribution of the charging plug port.

Specifically, as shown in FIG. 3, the power distribution unit 110 is provided with multiple controllable switches. Each of the controllable switches is controlled to be closed or opened, to cause the output ends of the DC/DC units 130 to be connected to different charging plug ports.

For example, an output end of a DC/DC unit 130 is connected to a corresponding charging plug port, or output ends of multiple DC/DC units 130 are connected in series and/or parallel to a same charging plug port, all of which fall within the protection scope of the embodiment of the present disclosure. The circuit for the charging station according to the embodiment of the present disclosure is provided with multiple charging plug ports.

The process of controlling the power distribution unit 110 to operate to cause at least one DC/DC unit to be connected to the corresponding charging plug port may be as follows. The control unit detects the output voltage of each of the DC/DC units 130 and receives a power requirement of a user, that is, a power requirement of a to-be charged device (such as an electric vehicle) to be connected to the corresponding charging plug port, and then controls the controllable switches in the power distribution unit 110 to be closed or opened according to the output voltage and the power requirement, so that the corresponding DC/DC unit 130 can output independently, or the DC/DC units output in a way that the DC/DC units 130 are connected in series or parallel. That is, the control unit controls the controllable switches in the power distribution unit 110 to be closed or opened according to output voltages of DC/DC units 130 and power requirements of users, so that output ends of different DC/DC units 130 are connected to a same charging plug port or different charging plug ports. In this way, output capacities of each DC/DC unit 130 and requirements of users are comprehensively considered. Therefore, compared with the multi-modular charging station in the conventional technology, the integrated charging station according to the embodiment of the present disclosure has a higher utilization rate.

Figure 4:
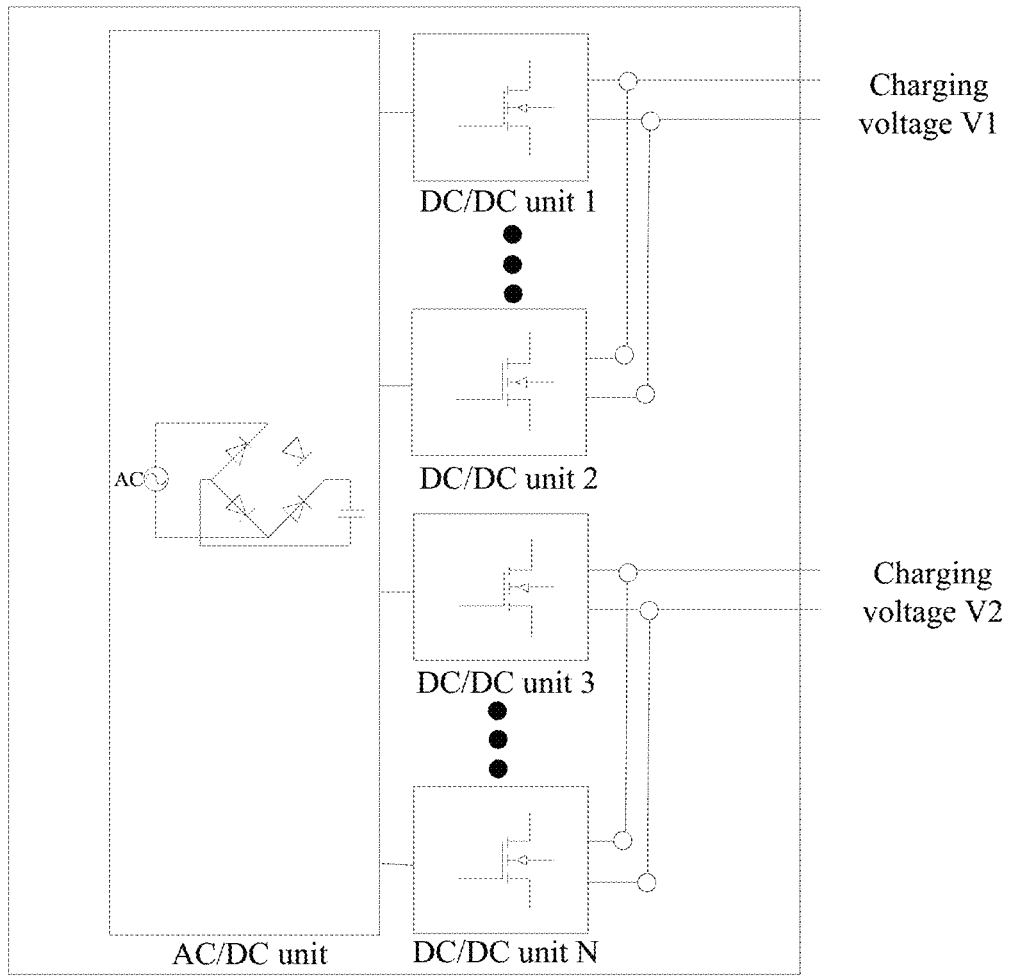
FIG. 4 is a schematic structural diagram showing a power distribution unit of a parallel branch in a circuit for a charging station with multiple plugs according to an embodiment of the present disclosure.

It should be noted that in the case that the control unit controls the output ends of the DC/DC units 130 to be connected to different charging plug ports, the DC/DC units 130 may be controlled to output different or the same voltages and different or the same powers according to the different power requirements of the charging plug ports, that is, according to the different charging requirements of electric vehicles, which depend on the actual requirements and all fall within the protection scope of the embodiment of the present disclosure. In the case that each of the DC/DC units 130 outputs independently, voltages (that is, a charging voltage V1, a charging voltage V2, a charging voltage V3, . . . , a charging voltage VN shown in FIG. 6) of different charging plug ports may be equal or unequal. In the case that the output ends of multiple DC/DC units 130 are connected in series and/or in parallel to a same charging plug port, for example, in the case that the control unit controls the power distribution unit 110 to cause different DC/DC units 130 to output power to a same charging plug, it is required to control the different DC/DC units 130 connected in parallel to output a same voltage and a same power according to the charging requirement of the electric vehicle. As shown in FIG. 4, the DC/DC unit 1 and the DC/DC unit 2 output a same voltage and a same power, and the DC/DC unit 3 and the DC/DC unit N output a same voltage and a same power. However, the charging plug ports output independently, that is, the charging voltage V1 and the charging voltage V2 may be equal or unequal, and the output of each of the DC/DC units is independent.

In practices, the control unit for controlling the controllable switches in the power distribution unit 110 to be closed or opened may be controllers respectively arranged in the DC/DC units 130, that is, each of the DC/DC units 130 is provided with an independent controller. The controller is configured to detect an output voltage of the corresponding DC/DC unit 130, and control power distribution of the DC/DC unit 130 by controlling the controllable switches in the power distribution unit 110 to be closed or opened.

Moreover, the DC/DC unit 130 describe above may be a DC power supply with an adjustable output range. The DC/DC unit 130 may automatically perform voltage regulation to adapt to the charging voltage of the electric vehicle. In addition, a main circuit of the DC/DC unit 130 may be any DC/DC conversion topologies, such as an isolated conversion topology or a non-isolated conversion topology. A main circuit of the AC/DC unit 120 is a single-phase rectifier power factor correction rectifier circuit or a three-phase rectifier power factor correction rectifier circuit, that is, the circuit for the charging station with multiple plugs according to the embodiment of the present disclosure may be applied to various common charging stations in the field.

In the circuit for the charging station with multiple plugs according to the embodiment of the present disclosure, the control unit detects the output voltage of each of the DC/DC units 130, and controls the controllable switches in the power distribution unit 110 to be closed or opened according to the output voltage of each of the DC/DC units 130 and power requirements of corresponding charging plug ports, that is, controls the output end of each of the DC/DC units 130 to be connected to the corresponding charging plug ports, to achieve power distribution of the charging plug ports. In other words, multiple charging plug ports are arranged, and the power distribution is performed for the charging plug ports by the control unit and the power distribution unit 110, to meet requirements of simultaneous uses of users, thereby improving the utilization rate of the charging station. Moreover, in the circuit for the charging station with multiple plugs, only one AC/DC unit 120 is used for rectification, and multiple DC/DC units 130 are connected to a DC side of the AC/DC unit 120 simultaneously, so that the number of the controllers and the control circuits of the rectifier unit is less, that is, the number of passive components is less, therefore the rectifier cost is low, the standby power consumption is small, and the reactive power loss is low.

A circuit for a charging station with multiple plugs is further provided according to another embodiment of the present disclosure. Based on the above embodiment, as shown in FIG. 3, the power distribution unit 110 includes at least one of a parallel branch 210 that connects the output ends of the DC/DC units 130 in parallel and a series branch 220 that connects the output ends of the DC/DC units 130 in series. The parallel branch 210 and the series branch 220 each is provided with a controllable switch.

As shown in FIG. 3, the parallel branch 210 includes a positive branch that connects positive output ends of corresponding DC/DC units 130 together and a negative branch that connect negative output ends of corresponding DC/DC units 130 together. The positive branch and the negative branch each is provided with a controllable switch. An equivalent circuit after the controllable switches arranged on the positive branches and the negative branches are all closed is as shown in FIG. 4.

Figure 5:
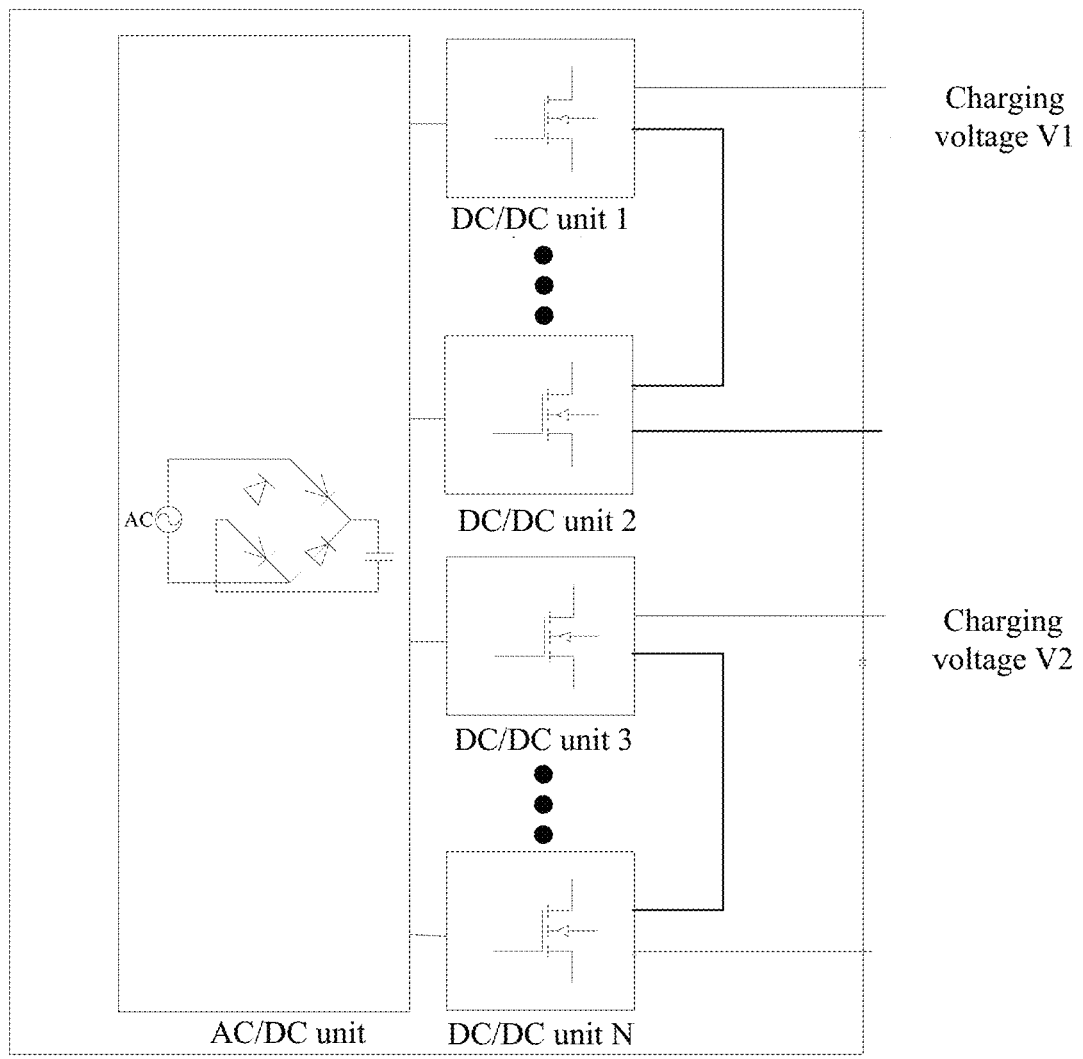
FIG. 5 is a schematic structural diagram showing a power distribution unit of a series branch in a circuit for a charging station with multiple plugs according to an embodiment of the present disclosure.

As shown in FIG. 3, the series branch 220 includes a branch that connects a positive output end of one DC/DC unit 130 to a negative output end of another DC/DC unit 130. An equivalent circuit after the controllable switches arranged on the series branches are closed is as shown in FIG. 5.

In practices, the power distribution unit 110 is implemented at least in the following three manners.

In a first manner, the power distribution unit 110 only includes at least one parallel branch 210. The output ends of different DC/DC units 130 are connected to a same charging plug port by controlling the controllable switches arranged on the positive branch and negative branch. In addition, the DC/DC units 130 are required to output a same voltage and a same power according to the power requirement of the user.

As shown in FIG. 4, the DC/DC unit 1 and the DC/DC unit 2 output a same voltage and a same power, and the DC/DC unit 3 and the DC/DC unit N output a same voltage and a same power. However, the charging voltage V1 and the charging voltage V2 may be equal or unequal, and are independent.

In a second manner, the power distribution unit 110 only includes at least one series branch 220. The output ends of different DC/DC units 130 are connected in series to a same charging plug port by controlling a controllable switch arranged on the series branch 220.

As shown in FIG. 5, the output end of the DC/DC unit 1 and the output end of the DC/DC unit 2 are connected in series with each other, and the output end of the DC/DC unit 3 and the output end of the DC/DC unit N are connected in series with each other. The charging plug ports output independently, that is, the charging voltage V1 and the charging voltage V2 may be equal or unequal.

In a third manner, the power distribution unit 110 includes at least one series branch 220 and at least one parallel branch 210, so that the output ends of different DC/DC units can be connected in series and in parallel to a same charging plug port. An equivalent circuit diagram after the controllable switches arranged on the series branch 220 and parallel branch 210 are all closed may be obtained in combination with FIG. 4 and FIG. 5, as long as the output ends connected in parallel output a same voltage and a same power.

Figure 6:
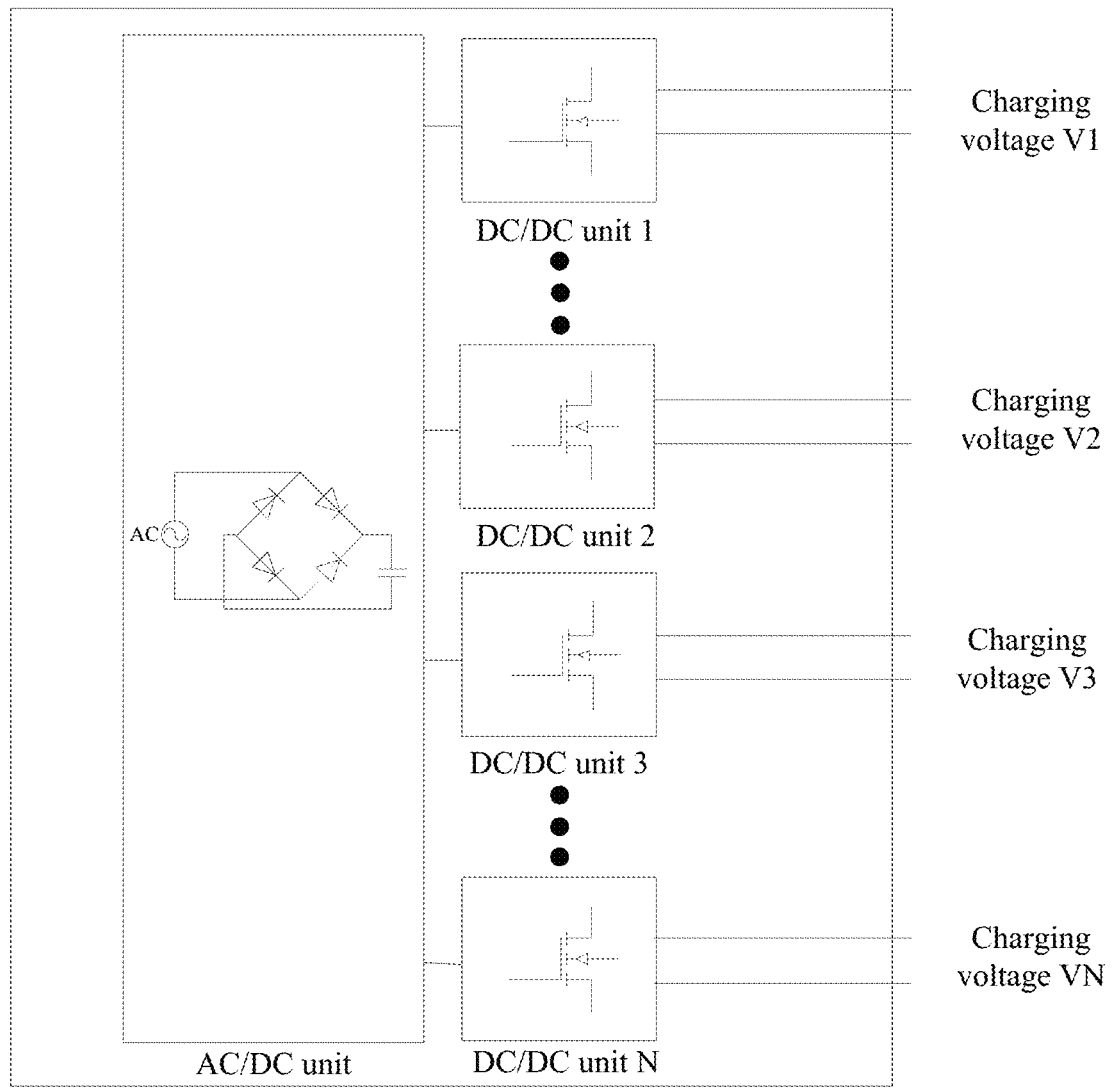
FIG. 6 is a schematic structural diagram showing a power distribution unit of an independent branch in a circuit for a charging station with multiple plugs according to an embodiment of the present disclosure.

Based on any one of the three manners described above, the power distribution unit 110 further includes independent branches 230 configured to cause the DC/DC units 130 output independently from each other. The independent branch 230 is provided with a controllable switch. An equivalent circuit after the controllable switches arranged on the independent branches 230 are closed is shown in FIG. 6.

In the case that the power distribution unit 110 further includes the independent branches 230, the output end of one DC/DC unit 130 can be connected to one corresponding charging plug port, and the output voltage and output power of each DC/DC unit 130 is determined according to the actual requirements. For example, the DC/DC units 130 are controlled to output same or different voltages and same or different powers according to different charging requirements of electric vehicles, which all fall within the protection scope of the embodiment of the present disclosure. As shown in FIG. 6, the charging voltage V1, the charging voltage V2, the charging voltage V3, . . . , the charging voltage VN may be equal or unequal, and the DC/DC units output independently.

It should be noted that the implementations of the power distribution unit 110 in the circuit for the charging station according to the embodiment of the present disclosure is not limited to the contents described above, as long as independent outputs of the DC/DC units are achieved or series connection and/or parallel connection of the DC/DC units 130 are achieved, which all fall within the protection scope of the embodiment of the present disclosure. In addition, the control unit controls the controllable switches in the power distribution unit to be closed or opened according to the output voltage of each of the DC/DC units 130 and a power requirement of corresponding charging plug ports, so that each of the DC/DC units 130, when outputting powers for different charging plugs, can be controlled to output different or a same voltage and different or a same power according to different charging requirements of electric vehicles (that is, the power requirements of the charging plug ports). In a case that each of the DC/DC units 130 outputs the power for a same charging plug, the DC/DC units 130 are controlled to output a same voltage and a same power according to different charging requirements of the electric vehicle.

In the circuit for the charging station with multiple plugs according to the embodiment of the present disclosure, each branch in the power distribution unit is provided with a controllable switch, therefore the control unit can control the controllable switch to be closed or opened, to cause the power distribution unit to be switched between a parallel connection, a series connection and an independent output. That is, the DC/DC units can output independently, or the DC/DC units are connected in series or in parallel for output. Each of the DC/DC units 130 can be controlled to output a required voltage and a required power according to the power requirement and a connected charging plug port. That is, any number of the DC/DC units 130 may be used for power output, and the output voltage of each of the DC/DC units 130 can be adjusted.

The principles for remaining parts are the same as the principles described in the above embodiments, which are not be repeated herein.

Figure 7:
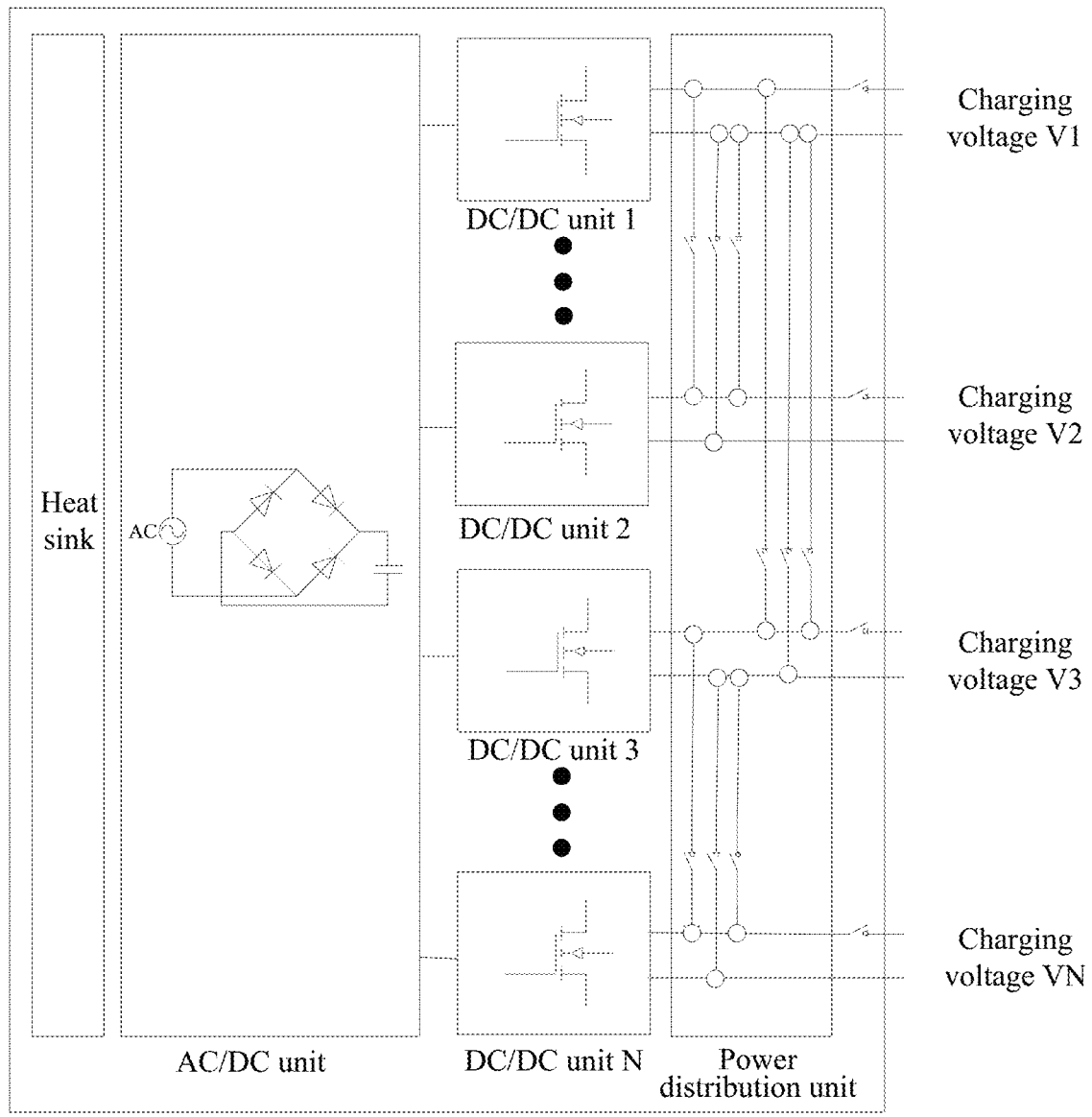
FIG. 7 is a schematic structural diagram of internal arrangement in a charging station with multiple plugs according to an embodiment of the present disclosure.

A charging station with multiple plugs is further provided according to an embodiment of the present disclosure. The charging station includes a shell, a heat sink arranged inside the shell, the circuit for a charging station with multiple plugs according to any one of the above embodiments, and multiple charging plugs arranged outside the shell. FIG. 7 illustrates a schematic structural diagram of an internal arrangement of the shell of the charging station with multiple plugs, where the shell is not shown.

Input ends of the charging plugs are connected to the charging plug ports in the circuit respectively.

It should be noted that in the conventional technology, as shown in FIG. 2, each module is provided with an independent fan heat dissipation structure, resulting in a serious noise pollution caused by fan noise superposition.

As shown in FIG. 7, in the charging station with multiple plugs according to the embodiment of the present disclosure, only one heat sink is used to dissipate heat from the charging station, so that the heat dissipation noise is low.

The charging station according to the embodiment of the present disclosure is provided with multiple charging plugs, to simultaneously meet requirements of multiple users, thereby improving the utilization rate of the charging station. Compared with the conventional technology, the number of the passive components is greatly reduced, the number of the control circuits is reduced, thereby saving the cost and space. In addition, according to the embodiment of the present disclosure, only one heat sink is used for heat dissipation, thereby reducing the noise pollution caused by multiple modules superposition.

The principles for remaining parts are the same as the principles described in the above embodiments, which are not be repeated herein.

The embodiments of the present disclosure are described in a progressive manner, the same or similar parts among the embodiments can be referred to each other, and each embodiment emphasizes the difference from other embodiments. In particular, for the system or the embodiment of the system, since they are similar to the embodiment of the method, the description of the system or the embodiment of the system is relatively simple, and for relevant matters references may be made to the description of the embodiment of the method. The above-described system and the embodiments of the system are only schematic. Units described as separated components may be or be not physically separated. Components shown as units may be or may be not physical units, i.e. the components may be located in one place or may be distributed onto multiple network units. The object of the solution of the embodiment may be achieved by selecting a part or all of the units according to the actual requirements. Those skilled in the art may understand and implement the embodiments without any creative work.

Those skilled in the art further understand that units and algorithm steps described in combination with the disclosed embodiments may be implemented by electronic hardware, computer software or a combination thereof. In order to clearly describe interchangeability of the hardware and the software, configurations and steps are generally described above based on functions. Whether the functions are implemented by the hardware or the software is determined by specific applications of the technical solutions and design constraints. For each of the specific applications, those skilled in the art may adopt a specific implementation to implement the functions described above, and the implementation should fall within the scope of the present disclosure.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A circuit for a charging station with multiple charging plugs, comprising a power distribution unit, a control unit, one alternating current (AC)/direct current (DC) unit and at least two DC/DC units, wherein
the AC/DC unit is connected with an input end of each of the DC/DC units via a bus;
an output end of each of the DC/DC units is connected to a corresponding charging plug port via the power distribution unit; and
the control unit is configured to detect an output voltage of each of the DC/DC units, and control the power distribution unit to operate according to the output voltage of each of the DC/DC units and a power requirement of a charging plug port, to cause at least one of the DC/DC units to be connected to the charging plug port to achieve power distribution of the charging plug port,
wherein the power distribution unit comprises at least one of a parallel branch that connects the output ends of the DC/DC units in parallel and a series branch that connects the output ends of the DC/DC units in series, wherein the parallel branch and the series branch each is provided with a controllable switch.

2. The circuit according to claim 1, wherein the parallel branch comprises a positive branch that connects positive output ends of the DC/DC units together and a negative branch that connects negative output ends of the DC/DC units together, wherein the positive branch and the negative branch each is provided with a controllable switch.

3. The circuit according to claim 1, wherein the series branch comprises a branch that connects a positive output end of one DC/DC unit to a negative output end of another DC/DC unit.

4. The circuit according to claim 1, wherein the power distribution unit further comprises independent branches configured to cause the DC/DC units output independently from each other, wherein the independent branches each is provided with a controllable switch.

5. The circuit according to claim 4, wherein each of the DC/DC units is connected to a corresponding charging plug port via one of the independent branches.

6. The circuit according to claim 4, wherein the independent branch comprises a positive branch and a negative branch arranged at the output end of the DC/DC unit corresponding to the independent branch, wherein at least the positive branch is provided with a controllable switch.

7. The circuit according to claim 1, wherein the control unit, for controlling the power distribution unit to operate, is configured to:
control the controllable switch in the power distribution unit to be closed or opened, to cause the DC/DC units to output independently or cause the DC/DC units to be connected in series and/or in parallel for output.

8. The circuit according to claim 1, wherein the control unit comprises controllers respectively arranged in the DC/DC units; and
the controller is configured to detect an output voltage of the corresponding DC/DC unit, and control the controllable switch in the power distribution unit to be closed or opened, to control power distribution of the DC/DC unit.

9. The circuit according to claim 1, wherein a main circuit of the DC/DC unit is an isolated conversion topology or a non-isolated conversion topology.

10. The circuit according to claim 1, wherein a main circuit of the AC/DC unit is a single-phase rectifier power factor correction rectifier circuit or a three-phase rectifier power factor correction rectifier circuit.

11. A charging station with multiple charging plugs, comprising a shell, a heat sink arranged inside the shell, a circuit for the charging station with multiple charging plugs, and a plurality of charging plugs arranged outside the shell, wherein
the circuit comprises a power distribution unit, a control unit, one alternating current (AC)/direct current (DC) unit and at least two DC/DC units, wherein
the AC/DC unit is connected with an input end of each of the DC/DC units via a bus;
an output end of each of the DC/DC units is connected to a corresponding charging plug port via the power distribution unit; and
the control unit is configured to detect an output voltage of each of the DC/DC units, and control the power distribution unit to operate according to the output voltage of each of the DC/DC units and a power requirement of a charging plug port, to cause at least one of the DC/DC units to be connected to the charging plug port to achieve power distribution of the charging plug port; and wherein input ends of the plurality of charging plugs are connected to the charging plug ports in the circuit respectively; and the heat sink is configured to dissipate heart from the circuit, wherein the power distribution unit comprises at least one of a parallel branch that connects the output ends of the DC/DC units in parallel and a series branch that connects the output ends of the DC/DC units in series, wherein the parallel branch and the series branch each is provided with a controllable switch.

* * * * *